July 10, 1928.
J. D. CARTER
1,676,727
COMPOSITE BOARD
Filed July 18, 1921
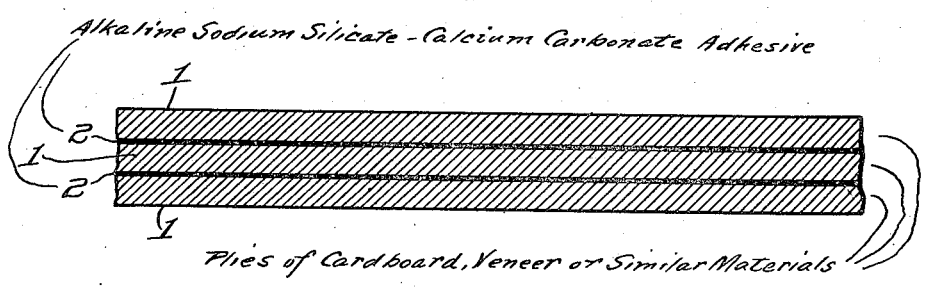
INVENTOR
John D. Carter,
WITNESS
BY
ATTORNEY Patented July 10, 1928.

UNITED STATES PATENT OFFICE.

1,676,727

JOHN D. CARTER, OF LANSDOWNE, PENNSYLVANIA.

COMPOSITE BOARD.

Application filed July 18, 1921. Serial No. 485,648.

Heretofore, cements which were cheaply available for the production of combined boards have been deficient in two important characteristics; first, they lacked in adhesive quality, and second, the time required for setting to take place was a fixed time which might or might not be convenient in the particular process at hand. Sodium silicate and sodium silicate cements have had the desired property of adhesiveness, but they have depended for their setting upon the loss of moisture, usually by evaporation. It was possible to control the setting time by varying the concentration of the sodium silicate solution used and by varying the proportions of inert matter which was mixed with the silicate, but such sodium silicate cements as could be caused to set without a baking process were always deficient in respect to their resistance to water. The sodium silicate, being a water solution, could under suitable conditions be re-dissolved and when it dissolved the cement disintegrated to a greater or less degree and lost its adhesive value. For instance, in the manufacture of multi-ply products, such as the plywood, which is used for shipping containers, furniture construction, trunk making and the like, or any wall board or container board made from plies of wood pulp or sheets of paper and which are, in the present state of the art, stuck together with suitable solutions of silicate of soda or of sodium silicate mixed with inert earthy materials, it is possible to make products which have satisfactory adhesion, rigidity and properties necessary to the carrying out of processes of their manufacture, but all are subject to the destructive influence of water.

One of the objects of my invention is to produce a combined board, the plies of which are united by a cement sodium silicate which, while retaining the desirable adhesive characteristics which are known in the art as obtainable with sodium silicate, will yet be insoluble in water and will impart to the board the property of resisting an exposure to water in a manner heretofore entirely impossible to the now known materials.

My object is further to produce a combined board which is easily and cheaply prepared and one which depends for its water proof qualities or properties on an internal chemical process which takes place in the cement rather than upon the loss of moisture.

My object is further to produce combined boards of various types above mentioned, having the plies or layers thereof united by a sodium silicate adhesive which renders the board capable of withstanding hot, damp, climatic conditions and even direct exposure to water, resistant to the attacks of vermin, and to have in general the desirable characteristics of the combined boards now commercially produced, with the addition of the property of resisting water.

A further object is to produce a combined board which when moistened will not yield alkali nor injuriously affect the rosin size, with which combined boards and paper products are rendered more resistant to moisture. Ordinary sodium silicate when it dissolves is likely to penetrate the board and destroy the waterproofing effect of the rosin size.

Further objects of my invention will appear in the specification and claims below.

Referring to the drawing forming a part of this specification there is illustrated therein, on a greatly enlarged scale, a combined board made in accordance with this invention and composed of a plurality of plies 1—1—1, which are united together with a layer or coating 2—2 of the sodium silicate adhesive combined with a salt of a metal with which the sodium silicate reacts to form a water insoluble compound and operative to prevent the separation of the plies when the board is subjected to moisture. While I have illustrated a board in which there are three plies so united, it is, of course, to be understood that the number of plies is immaterial.

Sodium silicate is a substance, the constituents of which may be varied within rather wide limits, and with this variation of constituents there is a wide variation in physical properties. Practically, the ratio of alkali, $Na_2O$, to silica, $SiO_2$, may vary between 1 to 1, which would be represented by the formula $Na_2SiO_3$, and 1 to 4, which might be represented by the formula $Na_2Si_4O_9$. Products of all intermediate compositions may be produced at will. Ratios of the character of 1 to 4 and up to 1 to 3.25 are commercially known as "neutral silicates" and silicates with a ratio of 1 to 2, or a greater ratio of the alkali to the silica are known as "alkaline silicates". I have discovered that silicates of these different types behave very differently when mixed with certain mineral substances, suitably pulverized, to make cements and adhesives. For instance, calcium carbonate or calcium phosphate may be mixed with a so-called neutral silicate and the mixture will remain liquid for a matter of several days, but if these same substances be mixed with solutions of the alkaline silicates 1:1 or 1:2 of the same concentration a chemical reaction occurs which causes the mass to set into a hard condition and the rate at which this setting takes place appears to be dependent upon the relative alkalinity of the silicate solution employed, that is, upon its ratio of alkali to silica.

Conversely, I have found that there are some substances which react readily with the neutral silicates, and react more and more slowly, as silicates of increasing alkalinity are used. Substances of this character are ordinary Portland cement and hydrated lime. In all cases where the setting action takes place, due to chemical causes, that is, where the viscosity of the mixture is greatly increased without the loss of moisture, until the product becomes solid, that product is substantially insoluble in water. I believe that this is due, at least in part, to the formation of double silicates of sodium and the various metals which form insoluble silicates. Thus, we may have a double silicate of sodium and substantially any metal, except potassium, lithium and the rare metals of the alkali group. It may also be that the water resistance is in part due to the formation of an insoluble gel of silicic acid, although it appears that this alone cannot account for the properties secured.

When one mixes substantially 60 parts by weight of whiting (calcium carbonate) with substantially 50 parts by weight of sodium silicate, in which the ratio of the alkali, $Na_2O$, to silica, $SiO_2$, is as 1 to 2 (represented by the formula $Na_2Si_2O_5$). and the concentration is equivalent to 31.5° Baumé (60° Baumé silicate diluted down to 31.5° Baumé) and uses this as the adhesive for combining a multi-ply paper board, and this board is allowed to stand for two or three days, a product is obtained which may be immersed in water for many hours and removed without the bond between the various plies being loosened. While setting takes place rapidly in such a process, I have found that a chemical reaction also takes place whereby the adhesive composition changes into a water insoluble composition and this reaction proceeds through a period of several days, during which time the board becomes progressively more water resistant.

To make such an adhesive, I may take 60° Baumé sodium silicate, the ratio of which is substantially as 1 to 2 ($Na_2Si_2O_5$) and dilute it to 31.5° Baumé, and add substantially an equal amount of whiting, as for instance, 50 parts by weight of the diluted sodium silicate and 60 parts by weight of whiting.

To make the combined board, a plurality of sheets or plies 1 of suitable stock such as paper stock are unreeled from large rolls thereof and are brought to a position in which the sheets or plies 1 are relatively near each other. In such position, one or more of the adjacent surfaces of the plies is, or are given, a coating 2 of the new adhesive above referred to and the plies 1 are then brought together under pressure, a thin layer 2 of the adhesive serving to unite the plies firmly together. The plies thus united are then allowed to stand for a considerable period of time, as also above indicated, whereupon as the chemical reaction between the ingredients of the adhesive progresses, the composition thereof will change to a water resisting composition; that is to say, a composition which does not readily absorb any water and which is not substantially affected by the presence of water. The resultant layer of adhesive will be a compound insoluble in water.

The board so formed will consist substantially of a plurality of plies of papers, cardboard or similar material united by the reaction products of an alkaline sodium silicate solution and calcium carbonate, said reaction products providing a waterproof or water resisting or insoluble adhesive which imparts its properties to the board itself, and is therefore particularly adapted for making containers in which goods may be shipped to, or stored in, places where they are subjected to hot, moist, climatic conditions.

I have further found that the time within which the reaction takes place, may be controlled and varied by a suitable selection of reacting substances on the one hand, or by the selection of silicate solutions of varying ratios on the other hand. Thus, I may find it advisable to employ a mixture of calcium carbonate or calcium phosphate, for I find that the time within which the reaction takes place decreases as the alkalinity in the silicate solution increases, or with calcium hydroxide (hydrated lime) or Portland cement, the effect of which is to length of time as the alkalinity of the silicate increases, or I may employ oxides, phosphates, carbonates or other salts of any of the metals to modify the rate of setting or the physical characteristics of the insoluble double silicate of the metal and sodium.

While I have particularly described one embodiment of my invention in the production of a laminated fiber board, it is obvious that a great variety of adaptation of the new product can be secured. For instance, by using a larger amount of the insoluble mineral constituent with the sodium silicate, a mass is secured which may be pressed into molds or suitably diluted when necessary, it may be spread upon a surface to form a coating, such as a paint, coating, or flooring material, all of which will be characterized by the formation of an insoluble product resulting from the action between sodium silicate and the compound of a metal contained therein. The reaction to produce the said composition may readily be secured by selecting a solution of sodium silicate of relative alkalinity appropriate to react in the desired time with the mineral compound or mixture of mineral compounds which may have been selected.

On account of its insoluble property, its hardness and its low cost, my composition is further adapted for other uses or purposes. Thus, it may be used as a cementitious binder for the broken stone, gravel, sand or similar materials in the making of roadways and in the surfacing of roadways. My composition so used imparts to the road a hard surface and makes the road resistant to the action of water thereon, whether said water be applied by sprinkling or flushing to allay the dust and to clean the road, or by the processes of nature. Water, even when lightly applied to the ordinary roads has the effect of softening the road, and increasing the wearing effect of the traffic thereon. When my invention is thus used in road making, the filler materials of the road composition or of the surface of the road are firmly united and cemented together by a cement or binder which is hard, durable and substantially water resisting.

Having thus described my invention, I claim and desire to protect by Letters Patent of the United States:

1. A laminated article comprising water-resistant plies united by the reaction products of alkaline sodium silicate solution and calcium carbonate, said article being resistant to water and humid climatic-conditions.

2. A combined board, the plies of which are united by an adhesive composed of the reaction products of calcium carbonate with a sodium silicate solution, in which the ratio of the alkali to the silica is from 1:3.5 up to 1:2.

3. A combined board, the plies of which are united by an adhesive consisting of the reaction products of a sodium silicate solution and calcium carbonate in substantially equal amounts by weight, said sodium silicate being one in which the ratio of the alkali to the silica is substantially 1:2.

In witness whereof, I have hereunto set my hand this 16th day of July, 1921.

JOHN D. CARTER.